United States Patent [19]
Iizuka

[11] Patent Number: 5,818,621
[45] Date of Patent: Oct. 6, 1998

[54] SCANNING OPTICAL SYSTEM

[75] Inventor: Takashi Iizuka, Tokyo, Japan

[73] Assignee: Asahi Kogaku Kogyo Kabushiki Kaisha, Tokyo, Japan

[21] Appl. No.: 500,199

[22] Filed: Jul. 10, 1995

[30] Foreign Application Priority Data

| Jul. 11, 1994 | [JP] | Japan | 6-158692 |
| Aug. 19, 1994 | [JP] | Japan | 6-195681 |
| Aug. 19, 1994 | [JP] | Japan | 6-195682 |
| May 30, 1995 | [JP] | Japan | 7-132457 |

[51] Int. Cl.$^6$ .................................................. G02B 26/08
[52] U.S. Cl. .................... 359/206; 359/207; 359/652; 359/654
[58] Field of Search .......................... 359/206, 207, 359/652, 654

[56] References Cited

U.S. PATENT DOCUMENTS

| 4,674,843 | 6/1987 | Baba et al. | 359/654 |
| 4,900,138 | 2/1990 | Atkinson, III et al. | 359/654 |
| 4,930,850 | 6/1990 | Morimoto | 359/207 |
| 5,055,663 | 10/1991 | Morimoto et al. | 250/201.4 |
| 5,299,050 | 3/1994 | Morimoto et al. | 359/212 |

*Primary Examiner*—Paul M. Dzierzynski
*Assistant Examiner*—Darren E. Schuberg
*Attorney, Agent, or Firm*—Greenblum & Bernstein P.L.C.

[57] ABSTRACT

A scanning optical system which includes a light source for emitting a beam of light, a light deflector for deflecting the beam of light in a main scanning direction, and a scanning lens which receives a beam of light deflected by the light deflector for focusing the deflected beam of light onto a scanning surface. The scanning lens includes a lens having a refractive index distribution in either the main or the sub-scanning direction.

29 Claims, 17 Drawing Sheets

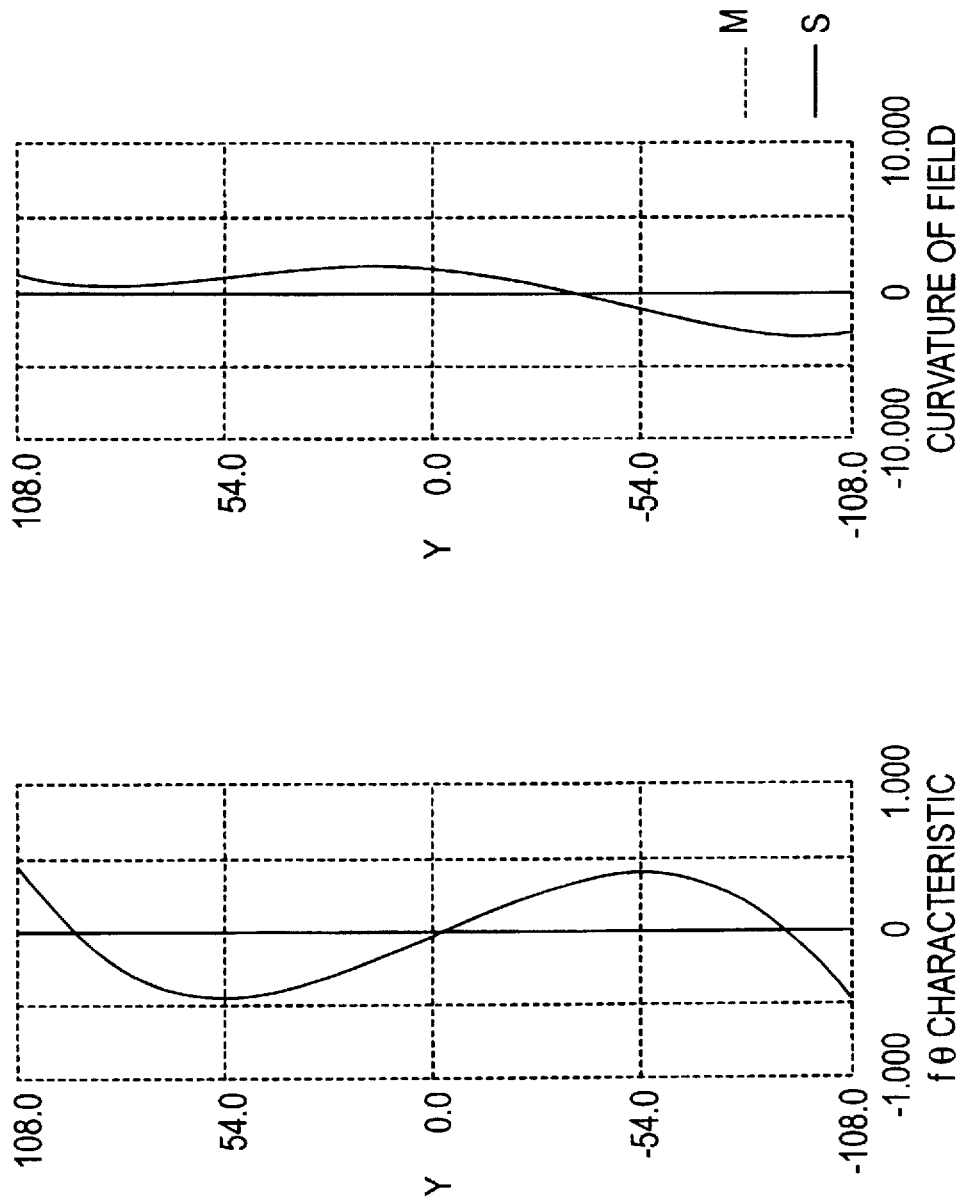

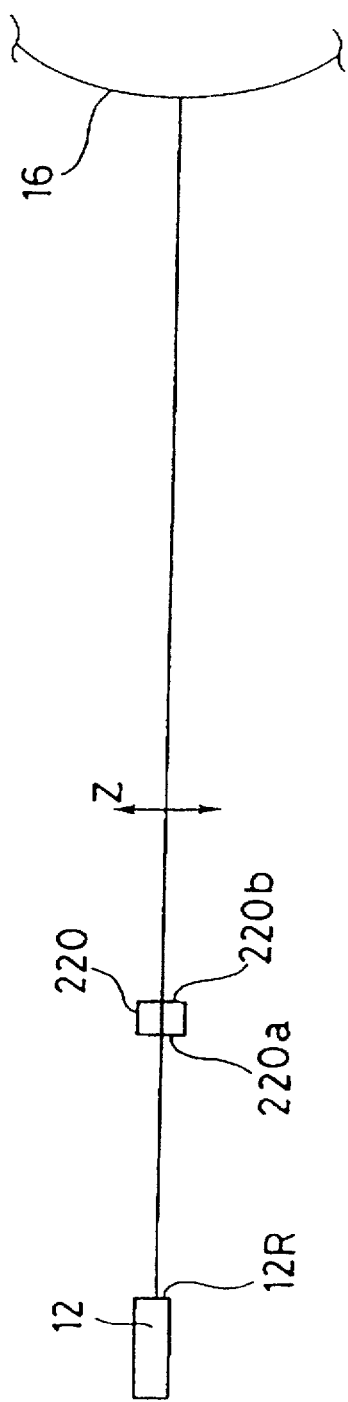

SCANNING OPTICAL SYSTEM

BACKGROUND OF THE INVENTION

1. Field of the Invention

The present invention relates to a scanning optical system.

2. Description of Related Art

A scanning optical system is essential to the operation of a laser printer, a laser scanner, a bar code reader or the like. In a typical scanning optical system, a polygonal mirror, a hologram disk or the like is used as a light deflector. A laser beam emitted from a semiconductor laser is incident upon, and deflected by, the light deflector. The laser beam subsequently passes through an fθ lens system which acts as a scanning lens, to scan a predetermined area on a scanning surface, i.e., the main scanning is executed. The fθ lens system enables the beam spot to move at constant speed along the scanning surface. The scanning surface could be, for example, a sensitive paper or plate. While the main scanning is being executed, the scanning surface is moved in a direction perpendicular to the direction of the main scanning, i.e., sub-scanning is executed. Thereby, the scanning surface is scanned two-dimensionally.

Regarding the fθ lens system, there have been a number of ideas proposed for correcting the curvature of field, chiefly in the main scanning direction. However, all of the ideas have adopted a common construction in which a plurality of lenses and/or an aspherical surface formed on a lens is utilized to make up the fθ lens system for correcting the curvature of field in the main scanning direction. However, this results in a high production cost, especially when many lenses are necessary for the correction. Furthermore, forming an aspherical surface on a lens is a difficult process.

In order to correct the curvature of field in the main scanning direction with an fθ lens system consisting of a plurality of lenses, it is generally considered necessary for at least one surface of a lens in the fθ lens system, such as a toric surface, to be aspherical in a main scanning plane. However, forming a toric surface as an aspherical toric surface is a difficult process.

Yet in the fθ lens system, although there have been a number of proposals for correcting the curvature of field in the main scanning direction, as noted before, there have been no proposals, as of yet, for effectively correcting the curvature of field in the sub-scanning direction. That is, little attention has been paid to the occurrence and effect of the curvature of field in the sub-scanning direction. This is partly because it is difficult to correct the curvature of field in the sub-scanning direction with an fθ lens system consisting of a small number of lenses. Of course, the fθ lens system could be made up of a small number of lenses by forming a complicated surface on one of the lenses in the system. However, such fθ lens system is not suitable for mass production.

SUMMARY OF THE INVENTION

The object of the present invention is to provide a scanning optical system in which the curvature of field in the main scanning direction is corrected without using a scanning lens having an aspherical surface.

Another object of the present invention is to provide a scanning optical system in which the curvature of field in the sub-scanning direction is corrected without using a scanning lens with a complicated lens surface, such as an aspherical surface of a special type.

To achieve the objects mentioned above, according to the first aspect of the present invention, there is provided a scanning optical system. A light source emits a beam of light, a light deflector deflects the beam of light in a main scanning direction, a scanning lens receives the beam of light deflected by the light deflector and focuses the deflected beam of light onto a scanning surface. The scanning lens includes a lens having a refractive index distribution at least in the main scanning direction.

The curvature of field in the main scanning direction on an image plane, i.e., a scanning surface, can be corrected by having a proper refractive index distribution along the main scanning direction to the scanning lens in a scanning optical system.

Preferably, the lens having the refractive index distribution has a positive power in the main scanning direction.

Preferably, the scanning lens comprises a single lens.

Preferably, the refractive index distribution decreases with distance from an optical axis of the scanning lens along the main scanning direction. The method of producing a lens having such a refractive index distribution is a well-known method. Therefore, in the present invention, the method will not be described.

Preferably, the refractive index distribution is rotationally symmetrical about an optical axis of the scanning lens.

The scanning optical system may further include a correcting lens provided between the scanning lens and the scanning surface. The correcting lens has a power in a sub-scanning direction perpendicular to the main scanning direction, which corrects a curvature of field in the sub-scanning direction.

One surface of the correcting lens, which faces the scanning lens, may be formed as a toric surface with a rotational axis extending in the sub-scanning direction.

According to the second aspect of the present invention, at least one surface of the aforementioned positive lens is formed as an anamorphic surface.

Preferably, the anamorphic surface is a toric surface with a positive power. A radius of curvature of the toric surface in the main scanning direction is larger than a radius of curvature in a sub-scanning direction perpendicular to the main scanning direction.

Preferably, a radius of curvature of the positive lens in a sub-scanning direction perpendicular to the main scanning direction varies depending upon a distance from an optical axis of the scanning lens.

Preferably, the radius of curvature varies to add a negative power to the anamorphic surface. The negative power increases with distance from the optical axis along the main scanning direction.

According to the third aspect of the present invention, there is provided a scanning optical system. A light source emits a beam of light, a light deflector deflects the beam of light in a main scanning direction, a scanning lens system receives a beam of light deflected by the light deflector and focuses the deflected beam of light onto a scanning surface. The scanning lens has a refractive index distribution in a sub-scanning direction perpendicular to the main scanning direction.

The curvature of field in the sub-scanning direction on an image plane, i.e., a scanning surface, can be corrected by providing a proper refractive index distribution to the scanning lens along the sub-scanning direction in a scanning optical system.

Preferably, the scanning lens is a single lens.

Preferably, the refractive index distribution is such that the refractive index of the scanning lens in the sub-scanning direction decreases with distance from an optical axis of the scanning lens along the sub-scanning direction. The method of producing a lens having such a refractive index distribution is a well-known method, and is not illustrated in the following description.

Preferably, the scanning lens has a positive power in the main scanning direction.

Preferably, one surface of the scanning lens is a rotationally symmetrical aspherical surface about an optical axis of the scanning lens, and the other surface is a toric surface.

The present disclosure relates to subject matter contained in Japanese patent application Nos. 6-158692, filed on Jul. 11, 1994, 6-195681 and 6-195682, both filed on Aug. 19, 1994, and 7-132457, filed on May 20, 1995, which are expressly incorporated herein by reference in their entireties.

BRIEF DESCRIPTION OF THE DRAWINGS

The invention will be described below in detail with reference to the accompanying drawings, in which:

FIG. 15 is a graph showing the fθ characteristic of the scanning optical system illustrated in FIGS. 9 and 10, where the scanning optical system is arranged in accordance with a fifth embodiment of the present invention;

FIG. 16 is a graph showing the curvature of field of the scanning optical system of the fifth embodiment;

FIG. 18 is a front view of the scanning optical system shown in FIG. 17;

DESCRIPTION OF THE PREFERRED EMBODIMENT

Generally, in a scanning optical system, a semiconductor laser emits a beam of light which scans a scanning surface along a predetermined scanning direction. While being scanned along the predetermined scanning direction, the scanning surface is moved in a direction perpendicular to the predetermined scanning direction, relative to the position where the beam of light scans. Therefore, the scanning surface is two-dimensionally scanned. In the following description, the predetermined scanning direction is referred to as a main scanning direction, and the direction of the relative movement of the scanning surface is referred to as a sub-scanning direction. Furthermore, a plane extending along the main scanning direction is referred to as a main scanning plane, and likewise, a plane extending along the sub-scanning direction is referred to as a sub-scanning plane.

First Embodiment

Figure 1:
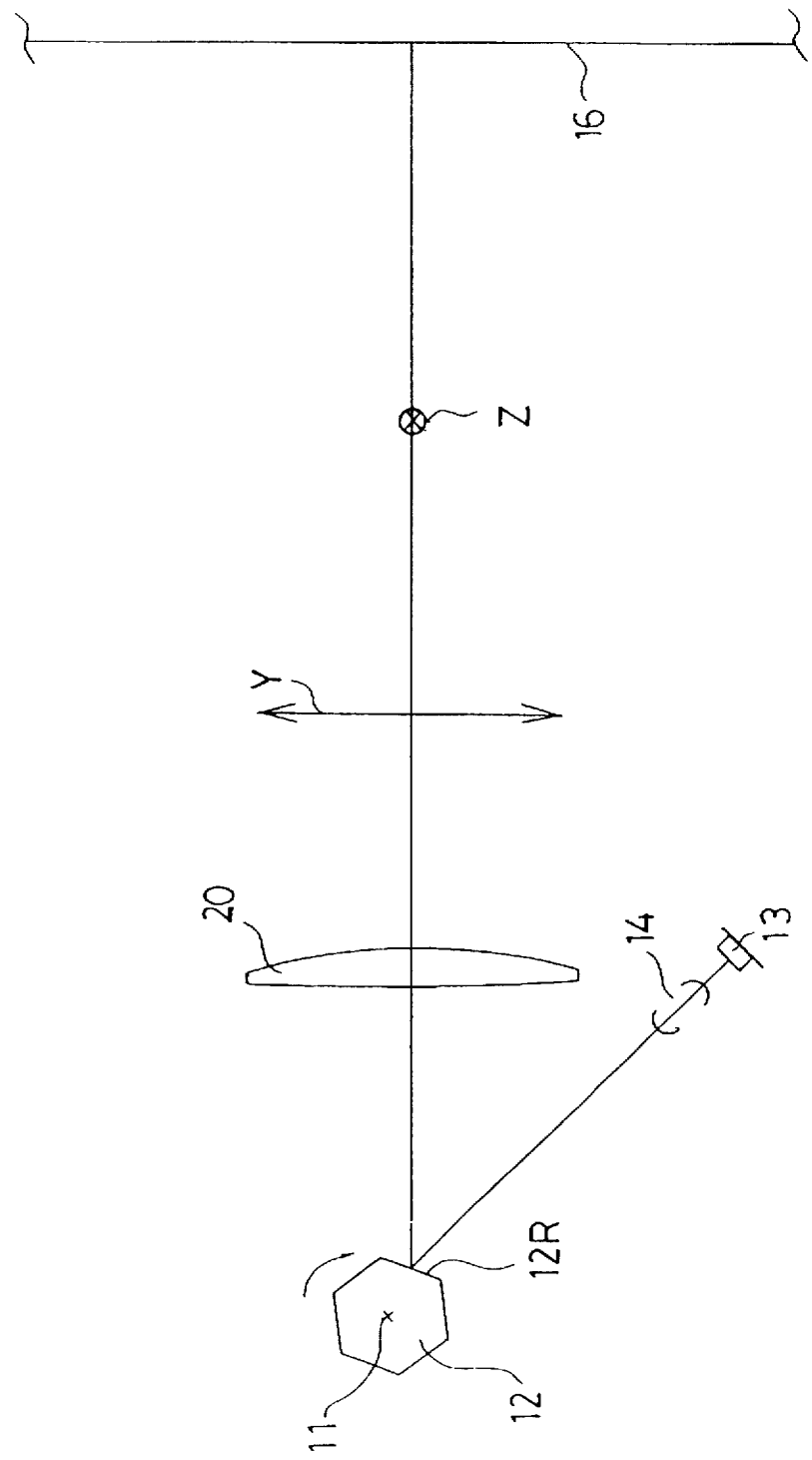
FIG. 1 is a plan view of a scanning optical system according to a first embodiment of the present invention, to which a first aspect of the present invention is applied.

FIG. 1 shows the configuration of the scanning optical system of a first embodiment of the present invention, to which a first aspect of the present invention is applied. In FIG. 1, a polygonal mirror 12 (i.e., a light deflector) is rotatable about a rotation axis 11. A laser beam emitted from a semiconductor laser 13 passes through a collimator lens 14 and is incident upon the polygonal mirror 12. The laser beam is deflected by each reflecting surface 12R. Subsequently, the laser beam passes through a single fθ lens 20, i.e., a scanning lens 20, to scan a scanning surface 16. The fθ lens is a positive lens and has a characteristic refractive index distribution. In case of a laser printer, the scanning surface 16 is a photosensitive drum. The collimator lens 14 collimates the laser beam passing therethrough.

Figure 8:
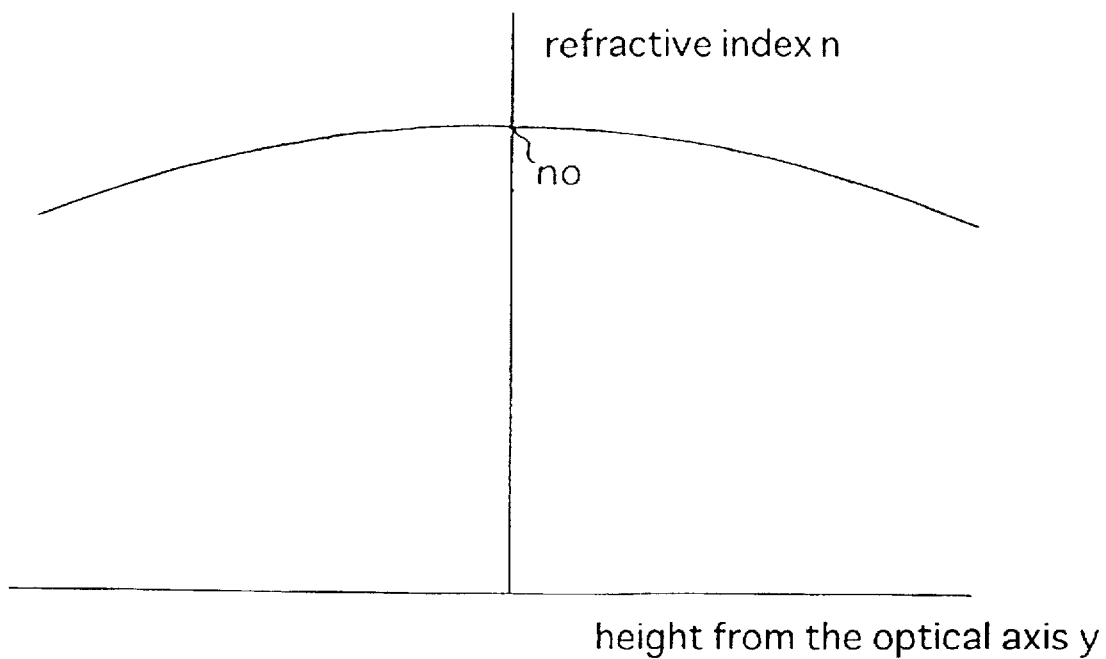
FIG. 8 is a graph showing an example of the refractive index distribution (in exaggerated form) of a positive lens having a specific refractive index distribution.

The fθ lens 20 has a refractive index distribution in the main scanning direction Y, i.e., the direction perpendicular to an optical axis O and in the plane of the paper of FIG. 1. The refractive index of the fθ lens 20 in the main scanning direction Y is highest on the optical axis O and gradually decreases with distance away from the optical axis O along the main scanning direction Y. FIG. 8 is a graph showing (in exaggerated form) an example of the refractive index distribution of a positive lens having a specific refractive index distribution in the main scanning direction. As can be seen from FIG. 8, the refractive index n decreases with an increase in distance (height) y from the optical axis of the lens in the main scanning direction. In FIG. 8, "$n_0$" indicates the refractive index at the point on the optical axis O. In a medium having such a refractive index distribution, that is, in a medium of a non-uniform material, it is a well known phenomenon that light does not pass straight through the material. Some lenses have been manufactured incorporating this phenomenon and are used in a variety of optical instruments. A SELFOC lens is one such example. "SELFOC" is the trade name of a lens produced by the Japanese company "Nihon-Itagarasu-Shouji-Kabushikigaisha". According to a first aspect of the present invention, the above phenomenon is utilized for an fθ lens in the scanning optical system so as to correct the curvature of field in the main scanning direction. This is the main feature of the first aspect of the present invention.

Figure 7:
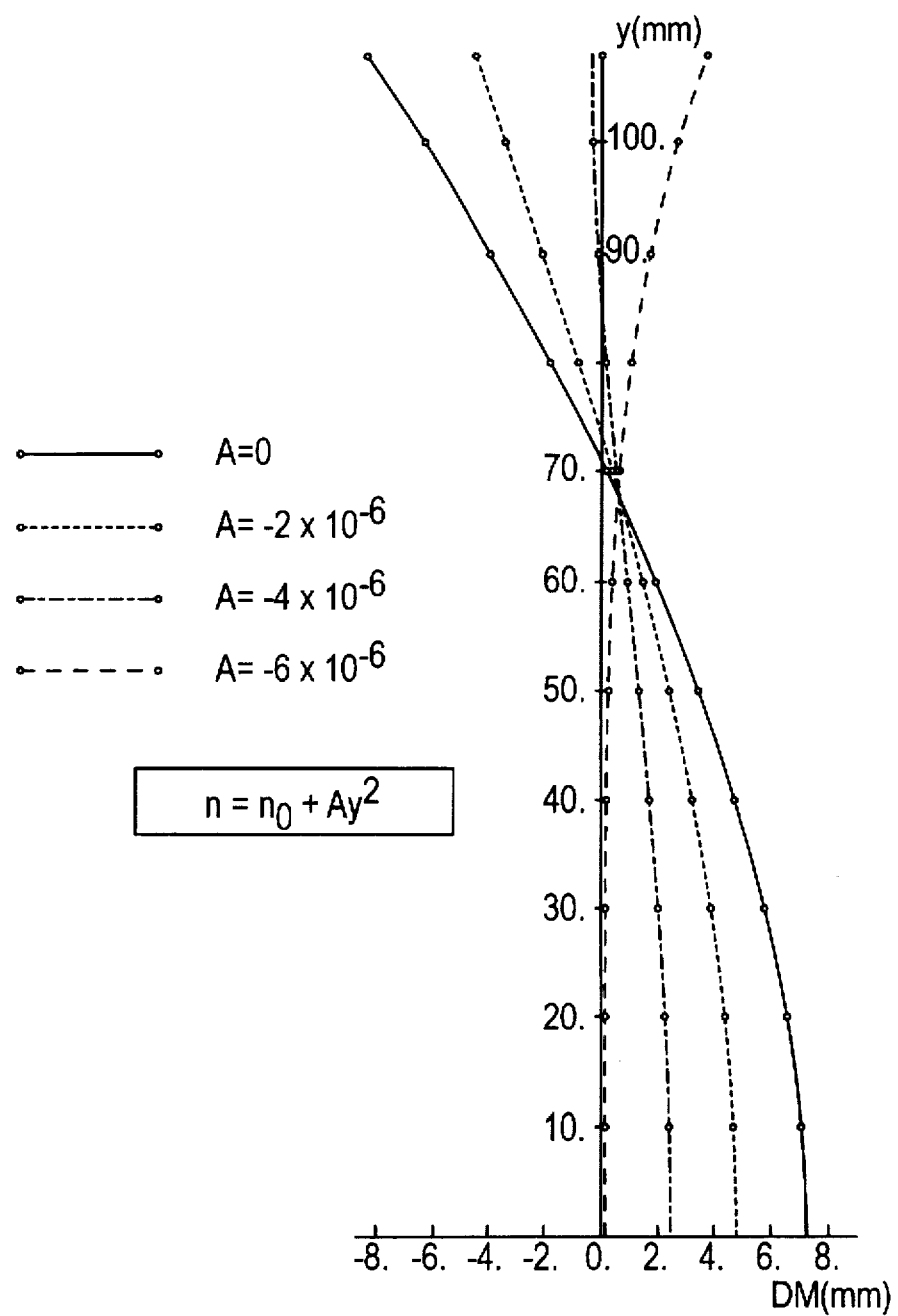
FIG. 7 is a graph showing the variation of the curvature of field in the lens having the characteristics shown in Table 1, where "y" represents a distance from the optical axis 0 in the main scanning direction and "A" represents a coefficient of refractive index distribution.

FIG. 7 shows the results of measuring the variation of the curvature of field in the lens having the characteristics shown in Table 1, when the coefficient of refractive index is varied. In this case, the refractive index n of the lens is defined by the following formula (1):

$$n = n_0 + Ay^2 \quad (1)$$

where "y" represents the distance (or height) from the optical axis in the main scanning direction Y. "A" represents the coefficient of refractive index distribution, and "$n_0$" represents the refractive index of that part of the lens on the optical axis O.

In the Tables below, "R" represents the radius of curvature of each lens surface along a main scanning plane, "$R_z$" represents the radius of curvature of each lens surface along the sub-scanning plane, "D" represents the thickness of the lens or a distance between the lens surfaces, and "N" represents the refractive index with respect to a wavelength of 780 nm.

In FIG. 7, the vertical line designates the aforementioned "y", i.e., a distance from the optical axis in the main scanning direction Y. The horizontal line designates the magnitude of the curvature of field. As can be seen from FIG. 7, when a lens made of a uniform material and therefore having no refractive index distribution, i.e., in the case where "A" is equal to zero, a negative curvature of field occurs. However, in the case of a lens having a negative refractive index distribution, i.e., having a refractive index distribution where the refractive index decreases as the distance "y" increases, it is apparent that the negative curvature of field is adequately corrected by being shifted towards the positive side. In the example shown in FIG. 7, in order to adequately correct the curvature of field in a preferential manner, a lens having a coefficient of refractive index distribution ranging from about $-4 \times 10^{-6}$ to $-6 \times 10^{-6}$ should be selected. The optimum coefficient of refractive index distribution "A" depends on the shape or the disposition of a lens. Furthermore, the optimum coefficient of refractive index distribution "A" may be calculated so as to correct the curvature of field caused by the combination of a lens together with other lenses.

TABLE 1

| Surface Name/No. | R | D | N |
| --- | --- | --- | --- |
| polygonal mirror |  | 75.00 |  |
| 1 | ∞ | 10.00 | 1.55 (*1) |
| 2 | −132.00 | 240.00 |  |

"*1" ... refractive index of the lens portion on the optical axis

Table 2 shows the concrete numerical data of the scanning optical system according to the first embodiment of the present invention.

Figure 2:
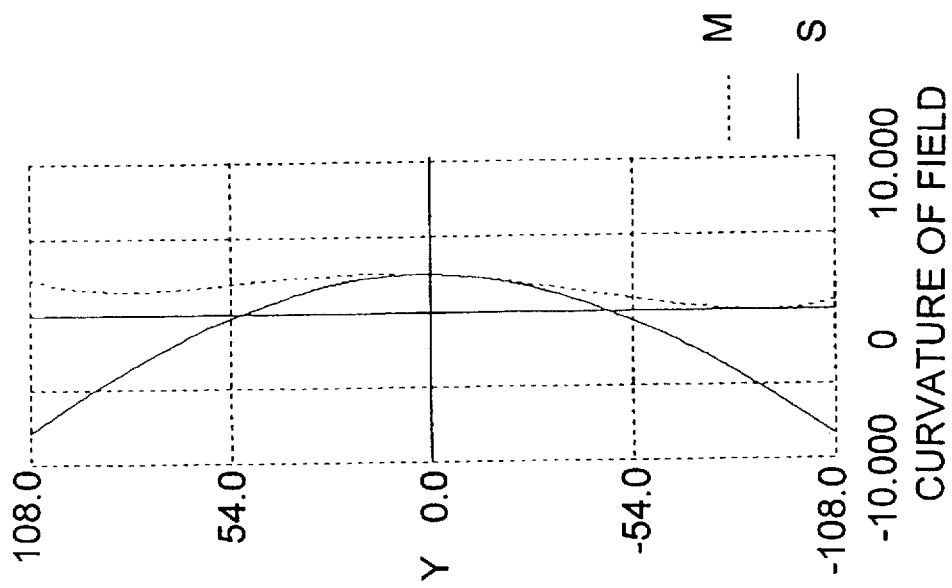
FIG. 2 is a graph showing the fθ characteristic of the scanning optical system illustrated in FIG. 1.
Figure 3:
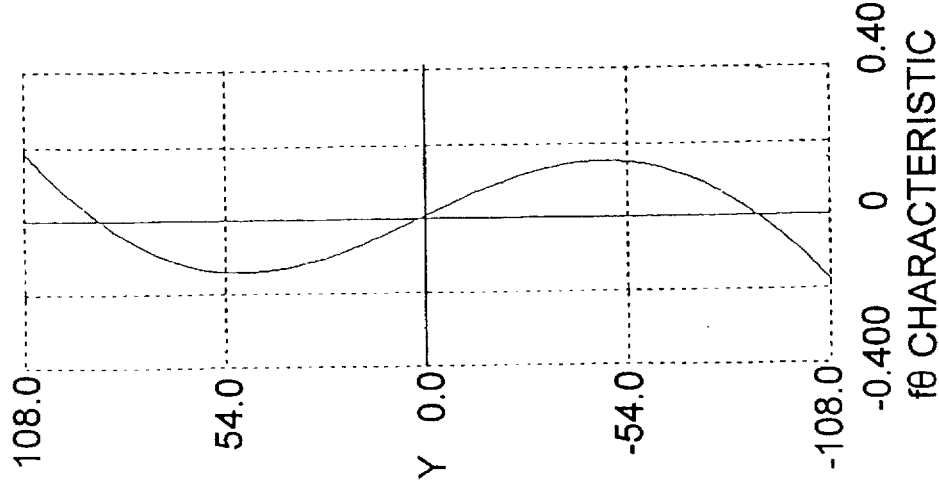
FIG. 3 is a graph showing the curvature of field of the scanning optical system illustrated in FIG. 1.

FIG. 2 is a graph showing the results of measuring the fθ characteristic in the scanning optical system of the first embodiment having the specific numerical values shown in Table 2. FIG. 3 is a graph showing the result of measuring the curvature of field in the scanning optical system of the first embodiment in the meridional section M and in the sagittal section S. In FIGS. 2 and 3, the vertical line Y designates the position in the main-scanning direction. In FIG. 2, the horizontal line designates the displacement of the image height with respect to the ideal image height (mm). In FIG. 3, the horizontal line designates the displacement of the image plane with respect to the ideal image plane (mm).

TABLE 2

| scanning coefficient = 242 Surface Name/No. | R | $R_z$ | D | N |
| --- | --- | --- | --- | --- |
| polygonal mirror |  |  | 75.00 |  |
| 1 | 700.00 | R.S. | 10.00 | (*2) |
| 2 | −170.00 | R.S. | 238.72 |  |

'R.S.' indicates the same value as "R", i.e., the radius of curvature along a main scanning plane, since the surface is rotationally symmetrical about the optical axis.

"*2" ... The refractive index N of the fθ lens 20 has a distribution derived from the following equation (2) when the coefficient of refractive index distribution A of the fθ lens is "$-6.0 \times 10^{-6}$."

$$N = 1.55 - (6.0 \times 10^{-6})(y^2) \quad (2)$$

where "y" is the distance from the optical axis.

The refractive index distribution is rotationally symmetrical about the optical axis.

In this embodiment, as can be seen from FIG. 3, the curvature of field in the sagittal section, i.e., in the sub-scanning direction Z, is large since there are no means provided for correcting the curvature of field in the sub-scanning direction Z. However, it can be seen that the curvature of field in the meridional section M, i.e., the main scanning direction Y, is adequately corrected.

Second Embodiment

Figure 4:
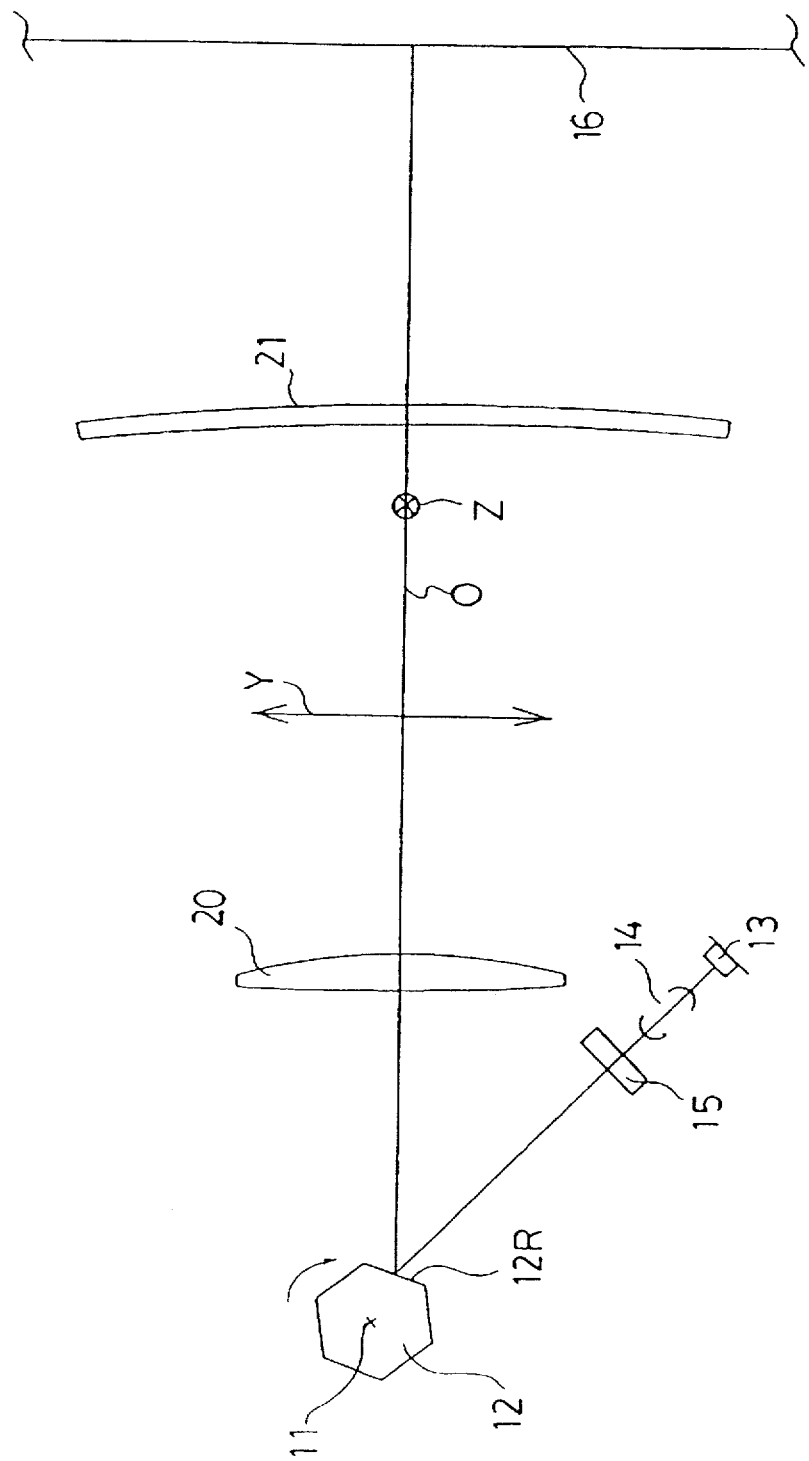
FIG. 4 is a plan view of a scanning optical system according to a second embodiment of the present invention, to which the first aspect of the present invention is applied.

FIG. 4 shows the configuration of the scanning optical system of a second embodiment of the present invention, to which the first aspect of the present invention is applied. In the second embodiment, a cylindrical lens 15 is placed between the collimator lens 14 and the polygonal mirror 12. Therefore, a laser beam emitted from the semiconductor laser 13 passes through the collimator lens 14 and the cylindrical lens 15, and is incident upon the polygonal mirror 12. The laser beam is deflected by each reflecting surface 12R. Subsequently, the laser beam passes through the fθ lens 20 to scan the scanning surface 16. The cylindrical lens 15 changes a cross-sectional shape of the already collimated laser beam into an oblong shape extending along the main scanning direction Y.

Figure 5:
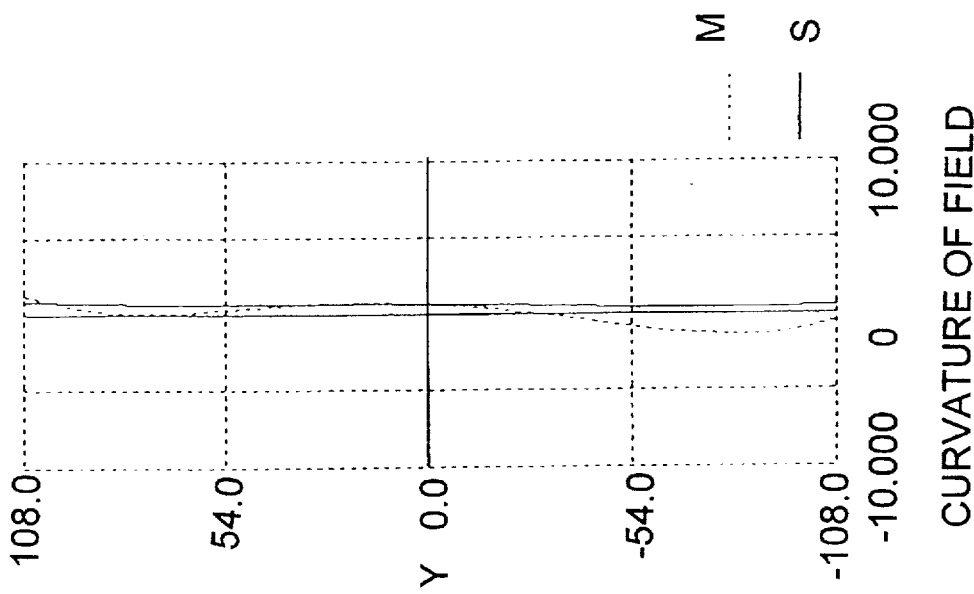
FIG. 5 is a graph showing the fθ characteristic of the scanning optical system illustrated in FIG. 4.
Figure 6:
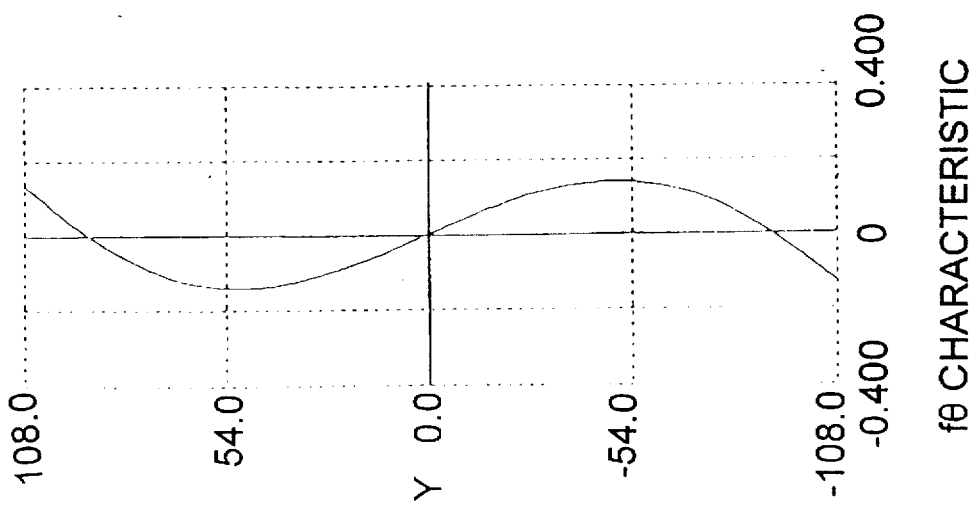
FIG. 6 is a graph showing the curvature of field of the scanning optical system illustrated in FIG. 4.

FIG. 5 is a graph showing the results of measuring the fθ characteristic in the scanning optical system of the second embodiment having the specific numerical values shown in Table 3. FIG. 6 shows a graph showing the result of measuring the curvature of field in the scanning optical system of the second embodiment in the meridional section M and in the sagittal section S. In FIGS. 5 and 6, the vertical line Y designates the position in the main-scanning direction. In FIG. 5, the horizontal line designates the displacement of the image height with respect to the ideal image height (mm). In FIG. 6, the horizontal line designates the displacement of the image plane with respect to the ideal image plane (mm).

In the second embodiment, a correcting lens 21 having a power in the sub-scanning direction Z is provided between the fθ lens 20 and the scanning surface 16. The correcting lens 21 corrects the curvature of field in the sub-scanning plane in addition to the field tilt. The first surface of the correcting lens 21, which faces in the direction of the polygonal mirror 12, is formed as a toric surface which has a rotational axis extending in the sub-scanning direction Z.

TABLE 3

| scanning coefficient = 242 Surface Name/No. | | R | $R_z$ | D | N |
|---|---|---|---|---|---|
| cylindrical lens | 1 | ∞ | | 38.80 | 4.00 | 1.48617 |
| 15 | 2 | ∞ | | | 92.35 |
| polygonal mirror | | | | | 75.51 |
| 1 | | 700.00 | R.S. | 10.00 | (*3) |
| 2 | | −170.00 | R.S. | 140.00 |
| 3 | | −900.00 | | 38.50 | 5.00 | 1.48617 |
| 4 | | −800.00 | R.S. | 96.91 |

"R.S." indicates the same value as "R" (i.e., the radius of curvature along a main scanning plane) since the surface is rotationally symmetrical about the optical axis.

"*3" . . . The refractive index N of the fθ lens 20 has a distribution derived from the following equation (3) under the condition that the coefficient of refractive index distribution A of the fθ lens is "−6.0×10⁻⁶."

$$N=1.55-(6.0\times10^{-6})(y^2) \quad (3)$$

where "y" is the distance from the optical axis.

The refractive index distribution is rotationally symmetrical about the optical axis.

In this embodiment, as can be seen from FIG. 6, the curvature of field is adequately corrected both in the sagittal section, i.e., in the sub-scanning direction Z, and in the meridional section M, i.e., the main scanning direction Y. This is due to the correcting lens 21 which corrects the curvature of field in the sub-scanning direction Z. This correcting lens 21 is provided in the scanning optical system of this embodiment.

As can be seen from the foregoing, according to the first aspect of the present invention, the curvature of field in the main scanning direction can be adequately corrected with a small number of lenses. This can be achieved at a production low cost with the arrangement particular to the present invention in which the scanning lens, i.e., fθ lens, includes a positive lens having a refractive index distribution in the main scanning direction.

Figure 9:
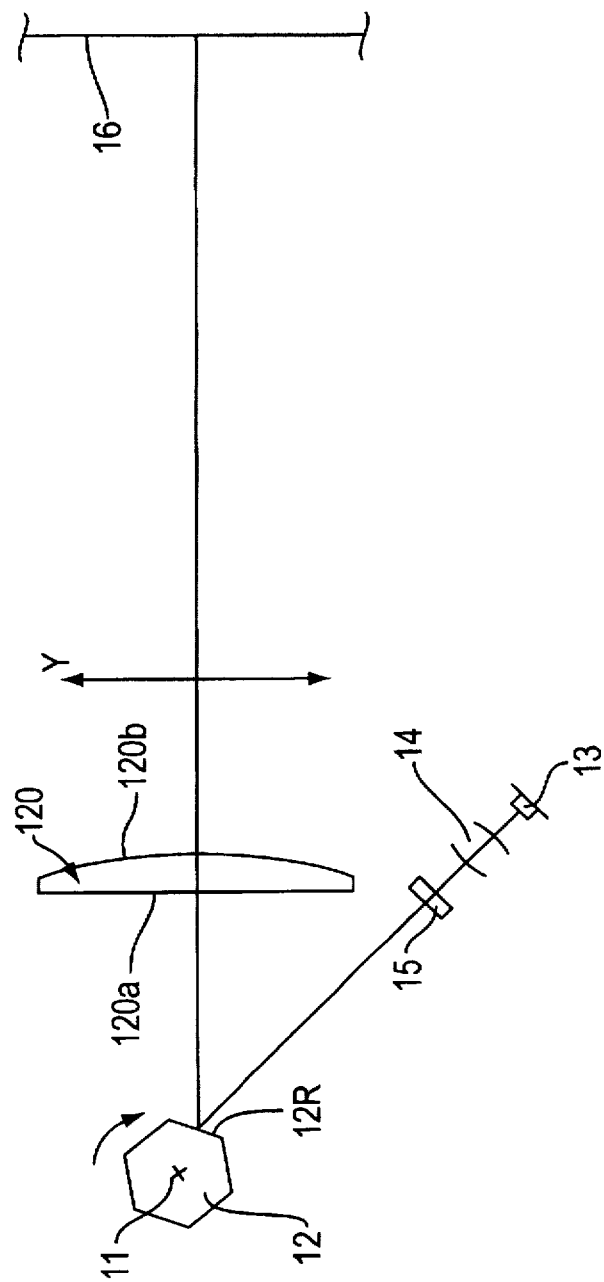
FIG. 9 is a plan view of a scanning optical system to which a second aspect of the present invention is applied.
Figure 10:
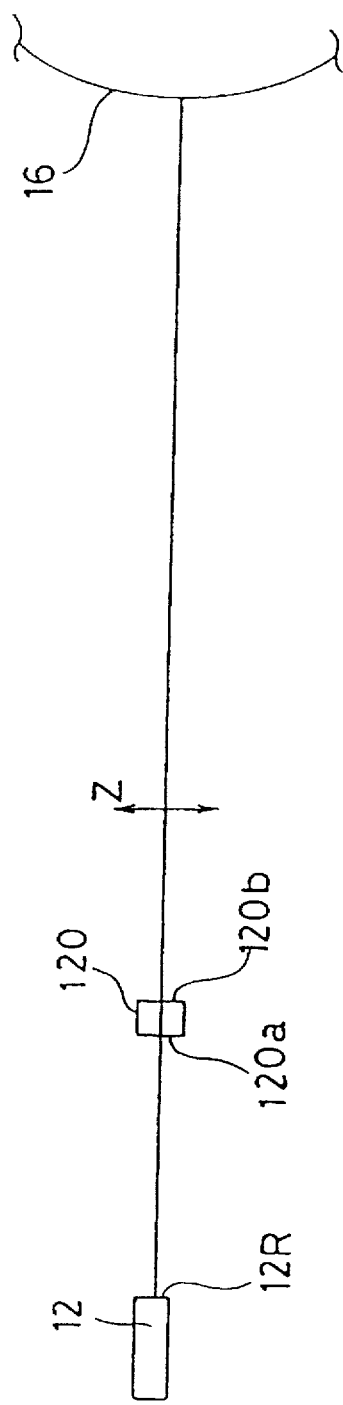
FIG. 10 is a front view of the scanning optical system shown in FIG. 9.

FIGS. 9 and 10 show the configuration of the scanning optical system to which the second aspect of the present invention is applied. The scanning optical systems according to third, fourth and fifth embodiments to which a second aspect of the present invention is applied, all have a common basic configuration. A laser beam emitted from the semiconductor laser 13 passes through the collimator lens 14 and the cylindrical lens 15, and is incident upon the polygonal mirror 12. The laser beam is deflected by each reflecting surface 12R. Subsequently, the laser beam passes through a single fθ lens, i.e., a scanning lens 120, to scan the scanning surface 16. The main feature of the scanning optical system to which the second aspect of the present invention is applied resides in the arrangement by which the curvature of field in the main scanning direction Y is corrected by utilizing the refractive index distribution of the fθ lens 120 while the curvature of field and field tilt in the sub-scanning direction Z are corrected by the shape of the fθ lens 120. The fθ lens 120 has a refractive index distribution in the main scanning direction Y, similarly to the fθ lens 20 in the first and second embodiments of the present invention.

Third Embodiment

Table 4 shows the concrete numerical data of the scanning optical system according to the third embodiment of the present invention, to which the second aspect of the present invention is applied.

Figure 11:
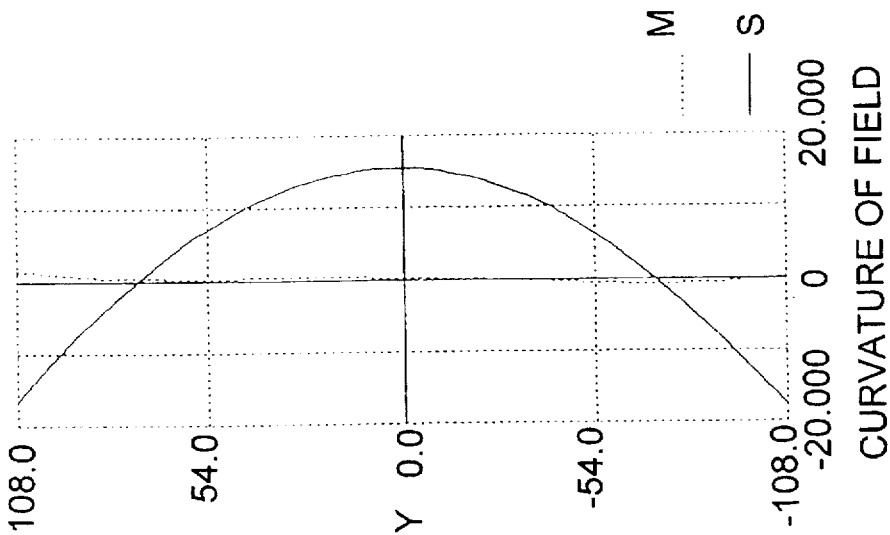
FIG. 11 is a graph showing the fθ characteristic of the scanning optical system illustrated in FIGS. 9 and 10, where the scanning optical system is arranged in accordance with a third embodiment of the present invention.
Figure 12:
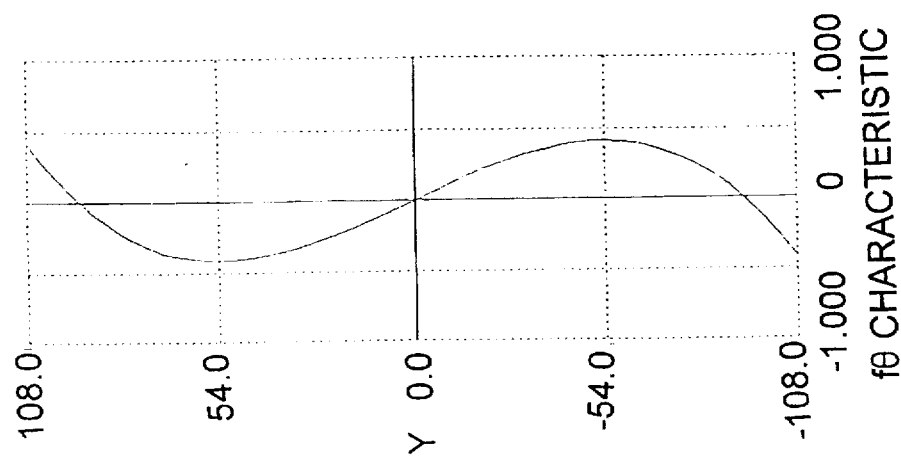
FIG. 12 is a graph showing the curvature of field of the scanning optical system of the third embodiment.

FIG. 11 is a graph showing the results of measuring the fθ characteristic in the scanning optical system of the third embodiment having the specific numerical values shown in Table 4. FIG. 12 shows a graph displaying the result of measuring the curvature of field in the scanning optical system of the third embodiment in the meridional section M and in the sagittal section S. In FIGS. 11 and 12, the vertical line Y designates the position in the main-scanning direction. In FIG. 11, the horizontal line designates the displacement of the image height with respect to the ideal image height (mm). In FIG. 12, the horizontal line designates the displacement of the image plane with respect to the ideal image plane (mm).

TABLE 4

| scanning coefficient = 237 Surface No. | | R | $R_z$ | D | N |
|---|---|---|---|---|---|
| cylindrical lens | 1 | ∞ | | 38.80 | 4.00 | 1.48479 |
| 15 | 2 | ∞ | | | 90.00 |
| polygonal mirror | | | | 68.00 |
| 1 | | ∞ | R.S. | 10.00 | (*4) |
| 2 | | −132.00 | −36.30 | 234.00 |

"R.S." indicates the same value as "R", i.e., the radius of curvature along a main scanning plane, since the surface is rotationally symmetrical about the optical axis.

"*4" . . . The refractive index N of the fθ lens 120 has a distribution derived from the following equation (4) under the condition that the coefficient of refractive index distribution A of the fθ lens is "−5.0×10⁻⁶."

$$N=2.55-(5.0\times10^{-6})(y^2) \quad (4)$$

where "y" is the distance from the optical axis.

The refractive index distribution is rotationally symmetrical about the optical axis.

In this embodiment, the second surface 120b of the fθ lens 120, which faces in the direction of the scanning surface 16, is formed as a toric surface having a positive power. As can be seen in FIGS. 11 and 12, both the fθ characteristic and curvature of field are adequately corrected by a single fθ lens. The curvature of field is especially well corrected in the main scanning direction Y.

Fourth Embodiment

Table 5 shows the concrete numerical data of the scanning optical system according to the fourth embodiment of the present invention, to which the second aspect of the present invention is applied.

Figure 13:
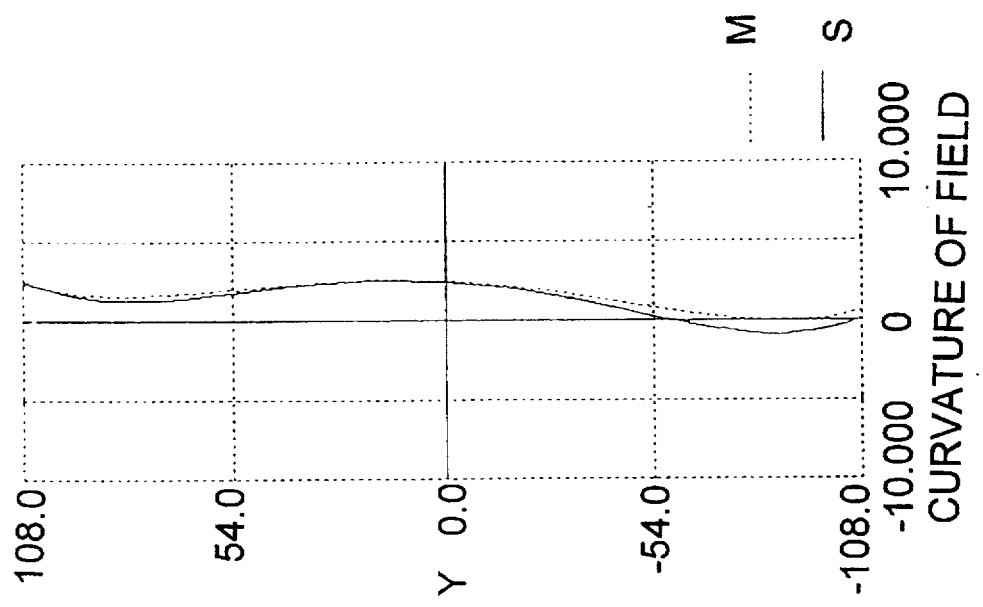
FIG. 13 is a graph showing the fθ characteristic of the scanning optical system illustrated in FIGS. 9 and 10, where the scanning optical system is arranged in accordance with a fourth embodiment of the present invention.
Figure 14:
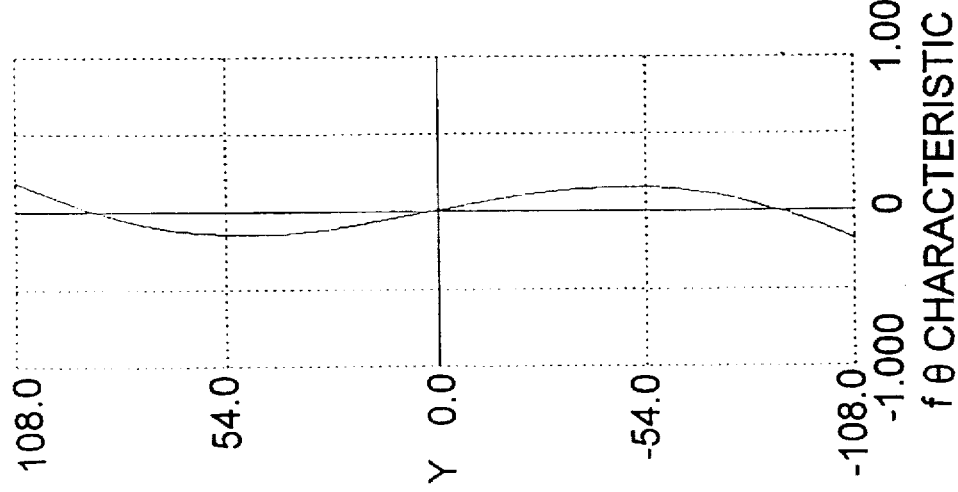
FIG. 14 is a graph showing the curvature of field of the scanning optical system of the fourth embodiment.

FIG. 13 is a graph showing the results of measuring the fθ characteristic in the scanning optical system of the fourth embodiment having the specific numerical values shown in Table 5. FIG. 14 is a graph displaying the result of measuring the curvature of field in the scanning optical system of the fourth embodiment in the meridional section M and in the sagittal section S. In FIGS. 13 and 14, the vertical line Y designates the position in the main-scanning direction. In FIG. 13, the horizontal line designates the displacement of the image height with respect to the ideal image height (mm). In FIG. 14, the horizontal line designates the displacement of the image plane with respect to the ideal image plane (mm).

TABLE 5

| scanning coefficient = 242 Surface No. | | R | Rz | D | N |
|---|---|---|---|---|---|
| cylindrical lens | 1 | ∞ | 38.80 | 4.00 | 1.48479 |
| 15 | 2 | ∞ | | 92.35 | |
| polygonal mirror | | | | 75.00 | |
| 1 | | 700.00 | −170.00 | 10.00 | (*5) |
| 2 | | −170.00 | −32.40 | 238.72 | |

"*5" ... The refractive index N of the fθ lens 120 has a distribution derived from the following equation (5) when the coefficient of refractive index distribution A of the fθ lens is "−6.0×10$^{-6}$."

$$N=1.55-(6.0\times10^{-6})(y^2) \tag{5}$$

where "y" is the distance from the optical axis.

The refractive index distribution is rotationally symmetrical about the optical axis.

In this embodiment, the first surface 120a of the fθ lens 120 is formed as a toric surface which has a positive power in the main scanning direction Y and a negative power in the sub-scanning direction Z. The second surface 120b of the fθ lens 120 is formed as a toric surface which has a positive power both in the main and sub-scanning directions Y and Z.

As can be seen in FIGS. 13 and 14, both the fθ characteristic and curvature of field are adequately corrected by a single fθ lens. The curvature of field is especially well corrected both in the main and sub-scanning directions Y and Z. This is due to the first and second surfaces 120a and 120b each being formed as an anamorphic surface.

Fifth Embodiment

Table 6 shows the concrete numerical data of the scanning optical system according to the fifth embodiment of the present invention, to which the second aspect of the present invention is applied.

FIG. 15 is a graph showing the results of measuring the fθ characteristic in the scanning optical system of the fifth embodiment having the specific numerical values shown in Table 6. FIG. 16 shows a graph displaying the result of measuring the curvature of field in the scanning optical system of the fifth embodiment in the meridional section M and in the sagittal section S. In FIGS. 15 and 16, the vertical line Y designates the position in the main-scanning direction. In FIG. 15, the horizontal line designates the displacement of the image height with respect to the ideal image height (mm). In FIG. 16, the horizontal line designates the displacement of the image plane with respect to the ideal image plane (mm).

TABLE 6

| scanning coefficient = 237 Surface Name/No. | | R | Rz | D | N |
|---|---|---|---|---|---|
| cylindrical lens | 1 | ∞ | 38.80 | 4.00 | 1.48479 |
| 15 | 2 | ∞ | | 91.90 | |
| polygonal mirror | | | 68.00 | | |
| 1 | | ∞ | ∞ | 10.00 | (*6) |
| 2 | | −132.00 | −36.30 | 234.00 | |

"*6" ... The refractive index N of the fθ lens 120 has a distribution derived from the following equation (6) under the condition that the coefficient of refractive index distribution A of the fθ lens is "−5.0 ×10$^{-6}$."

$$N=1.55-(5.0\times10^{-6})(y^2) \tag{6}$$

where "y" is the distance from the optical axis.

The refractive index distribution is rotationally symmetrical about the optical axis.

In this embodiment, the second surface 120b of the fθ lens 120 is formed as a toric surface having a positive power. The first and second surfaces 120a and 102b of the fθ lens are each formed as a surface with a radius of curvature in a sub-scanning plane. The radius of curvature is defined by the following equation (7) as a function of the height from the optical axis. For this arrangement, as can be seen in FIGS. 15 and 16, both the fθ characteristic and the curvature of field are adequately corrected for a single fθ lens.

$$Rz(h)=Rz_0^{-1}+B\times h^2 \tag{7}$$

where "h" represents the height or distance from the optical axis, and "B" represents the coefficient of refractive index distribution.

first surface 120a;

$Rz_0=\infty$ $B=-4.0\times10^{-7}$ second surface 120b;

$Rz_0=-36.3$ $B=-4.0\times10^{-7}$

As can be seen from the foregoing, according to the second aspect of the present invention, the correction of the curvature of field in a main scanning plane is achieved by utilizing the refractive index distribution of the scanning lens and the correction of the curvature of field in a sub-scanning plane is achieved by utilizing the anamorphic surfaces of the scanning lens and each correction can be carried out independently of one another. Therefore, even in the case where the fθ lens is a single lens, the curvature of field can be adequately corrected in both main and sub-scanning planes.

Sixth Embodiment

Figure 17:
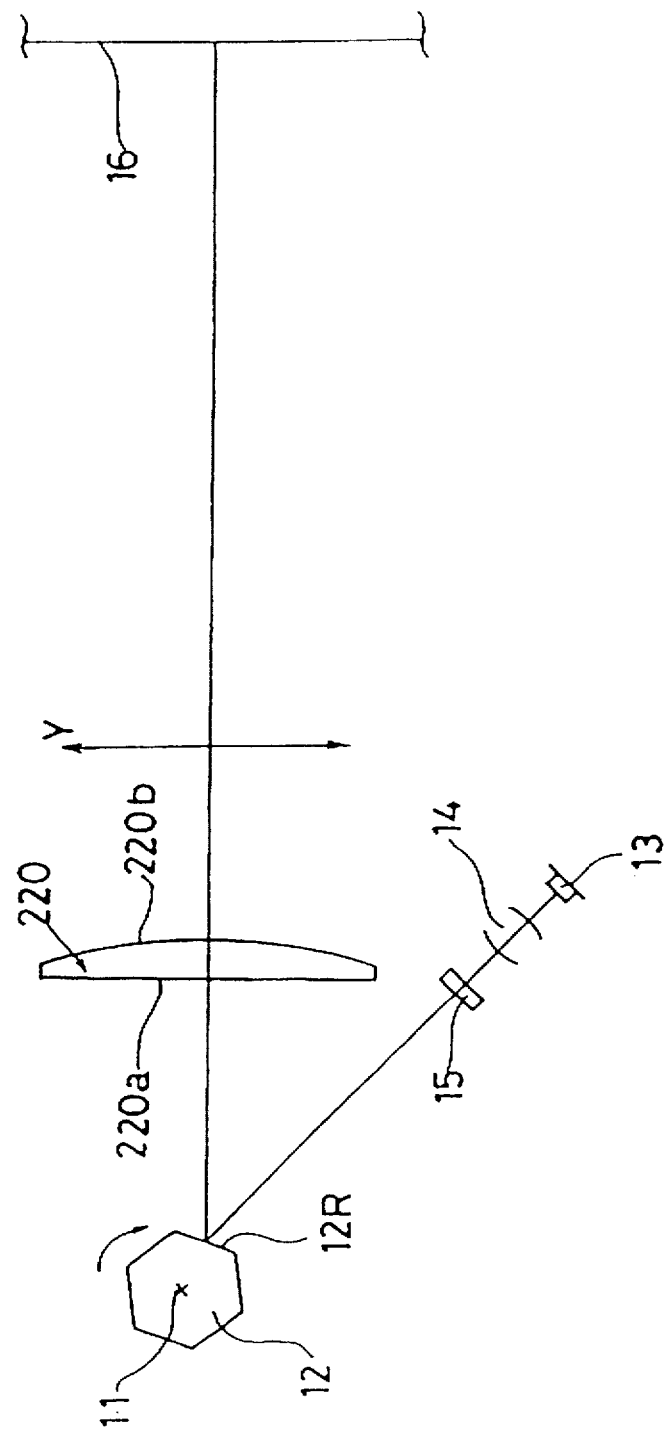
FIG. 17 is a plan view of a scanning optical system according to a sixth embodiment of the present invention, to which a third aspect of the present invention is applied.

FIGS. 17 and 18 show the configuration of the scanning optical system according to a sixth embodiment of the present invention, to which a third aspect of the present invention is applied. In the scanning optical system to which the third aspect of the present invention is applied, a laser beam emitted from the semiconductor laser 13 passes through the collimator lens 14 and the cylindrical lens 15, and is incident upon the polygonal mirror 12. The laser beam is deflected by each reflecting surface 12R. Subsequently, the laser beam passes through a single fθ lens, i.e., a scanning lens 220, to scan the scanning surface 16. The main feature of the scanning optical system to which the third aspect of the present invention is applied resides in the arrangement by which the curvature of field in the sub-scanning direction Z is corrected by utilizing the refractive index distribution of the fθ lens 220 unique to the present invention.

Figure 24:
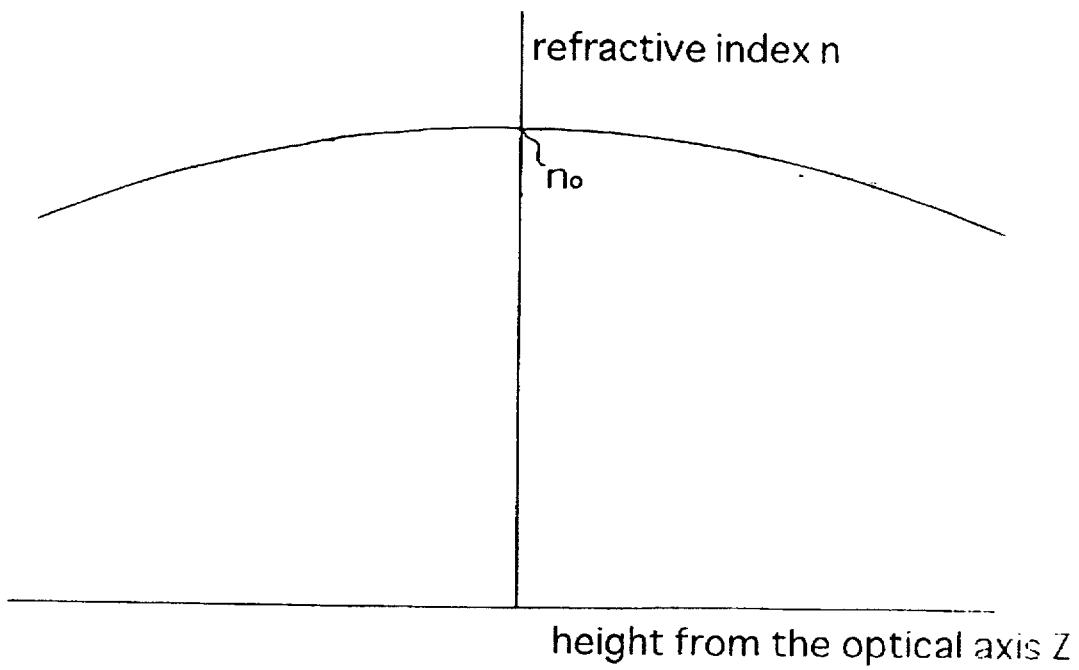
FIG. 24 is a graph showing an example of the refractive index distribution (in exaggerated form) of a positive lens having a specific refractive index distribution.

The fθ lens 220 has a refractive index distribution in the sub-scanning direction Z, i.e., the direction perpendicular to the optical axis O and perpendicular to the plane of the paper of FIG. 17. The refractive index of the fθ lens 220 in the sub-scanning direction Z is highest on the optical axis O and gradually decreases with distance from the optical axis O. FIG. 24 is a graph showing an example (in exaggerated form) of the refractive index distribution of a positive lens having a specific refractive index distribution in the sub-scanning direction. As can be seen from FIG. 24, the refractive index n decreases as the distance or height z from the optical axis of the lens increases in the sub-scanning direction. In FIG. 24, "$n_0$" indicates the refractive index at the point on the optical axis O. In a medium having such a refractive index distribution, that is, in a medium of a non-uniform material, it is a well known phenomenon that light does not pass straight through the material. As noted above, a SELFOC lens is one such lens manufactured by making the most of this phenomenon. In the third aspect of the present invention, the above phenomenon is utilized for the fθ lens to correct the curvature of field in the sub-scanning direction in the scanning optical system, which is the main feature of the third aspect of the present invention.

Figure 21:
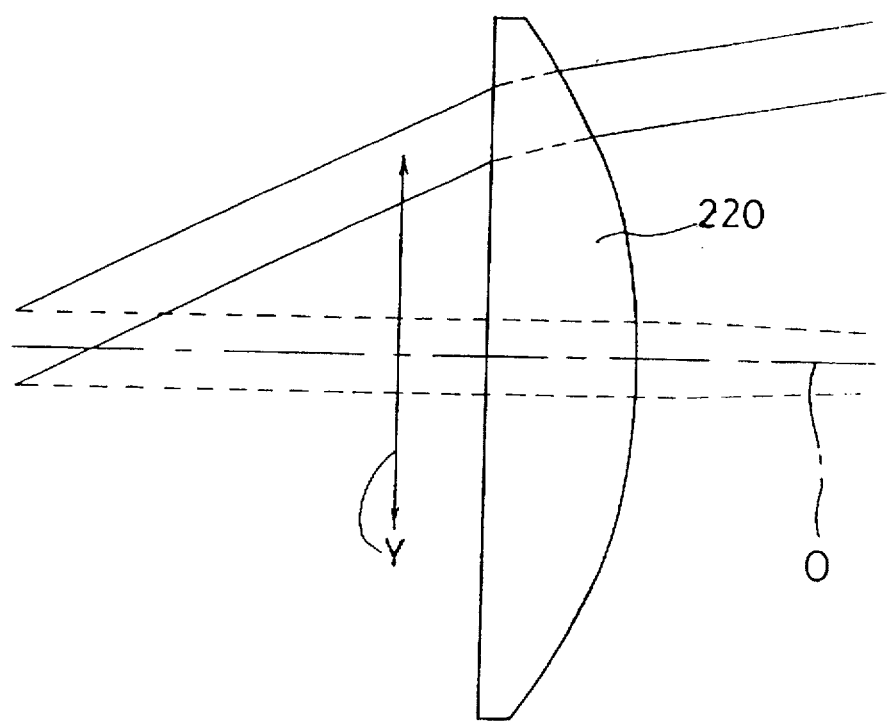
FIG. 21 is a plan view of the scanning lens (fθ lens) shown in FIGS. 17 and 18, illustrating the general shape of the scanning lens along a main scanning direction.
Figure 22:
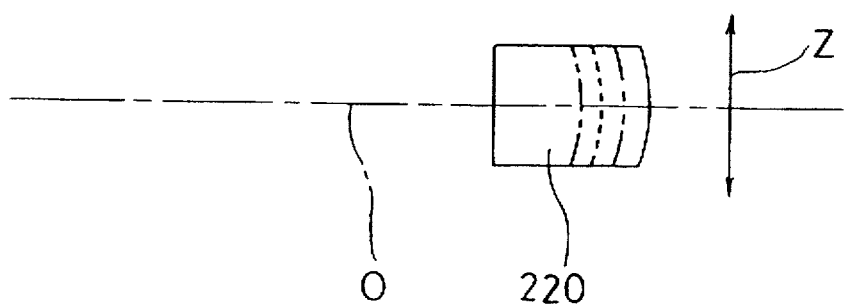
FIG. 22 is a front view of the scanning lens shown in FIG. 21, illustrating the general shape of the scanning lens along a sub-scanning direction.

FIGS. 21 and 22 show the general shape of the scanning lens or fθ lens 220. The fθ lens 220 has a positive power in the main scanning direction Y. Therefore, the thickness of the fθ lens 220 in the direction of the optical axis O is at a maximum on the optical axis O and decreases with distance away from the optical axis O. That is, in the main scanning direction, the length of the laser beam's path passing through the circumferential portion of the lens within the lens, is shorter than that of the laser beam passing through the center of the lens. When light passes through a lens having a refractive index distribution, the longer the length of the path within the lens, the greater the influence exerted by the lens upon the light. Therefore, when the scanning lens has a positive power in the main scanning direction and also has a refractive index distribution in the sub-scanning direction, the scanning lens may be utilized for correcting the curvature of field in the sub-scanning direction by shifting the negative curvature of field towards the positive side in the circumferential power of the lens. That the scanning lens has a power in the main scanning direction means that the scanning lens is a convex lens. Thus, the length of the path of the laser beam passing through the circumferential portion of the lens is shorter than that of the laser beam passing through the center of the lens. This enables the lens to correct the curvature of field in the sub-scanning direction. In contrast, if the length of the laser beam's path passing within the circumferential portion of the lens is the same as that of the laser beam passing through the center of the lens, the image plane would merely by shifted along the direction of the optical axis.

Figure 23:
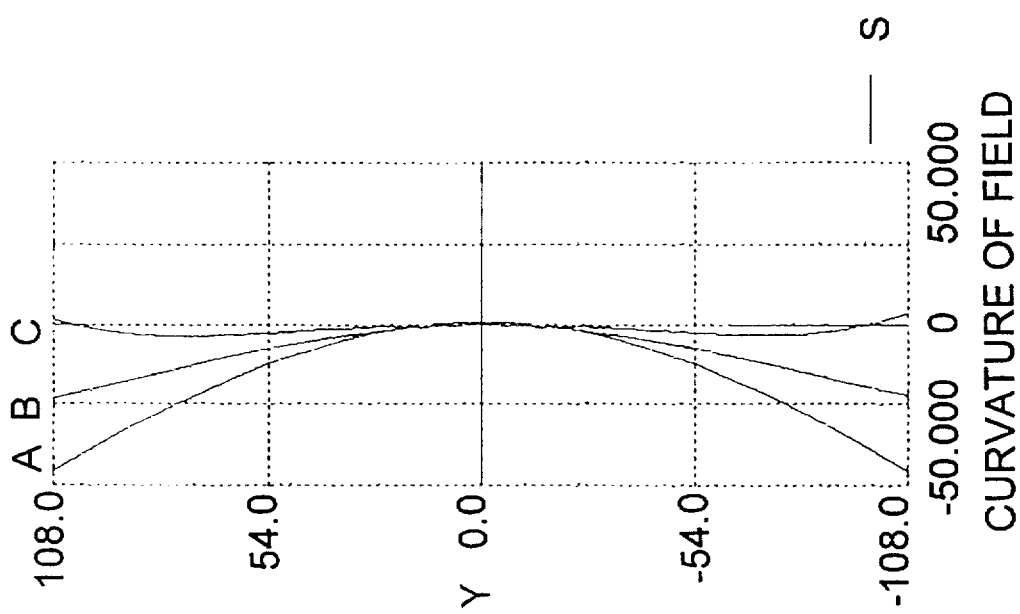
FIG. 23 is a graph showing the variation of the curvature of field in a lens having the characteristics shown in Table 8, where "z" represents a distance from the optical axis O in the sub-scanning direction and "A" represents a coefficient of refractive index distribution.

FIG. 23 shows the results of measuring the variation of the curvature of field in the sub-scanning direction Z in the lens having the characteristics shown in Table 7 where the coefficient of refractive index distribution ("A") is: (1) (0), (2) (−0.60×10⁻⁴), or (3) (−1.19×10⁻⁴) when the refractive index n of the lens is defined by the following formula (8):

$$n = n_0 + Az^2 \qquad (8)$$

where "z" represents the distance or height from the optical axis in the sub-scanning direction Z, "A" represents the coefficient of refractive index distribution, and "$n_0$" represents the refractive index of that part of the lens on the optical axis O (1.55 in this particular case).

1) n=1.55 (where the lens has no refractive index distribution) (Rz=−41.813)
2) n=1.55−0.60×10⁻⁴×z² (Rz=−45.700)
3) n=1.55−1.19×10⁻⁴×z² (Rz=−50.400)

As can be understood from FIG. 23, a lens which has a negative refractive index distribution, i.e., a distribution where the refractive index decreases with distance away from the optical axis, corrects the curvature of field by shifting it towards the positive side. In this particular example, it can be said that the curvature of field in the sub-scanning direction is corrected in a most preferential manner when the coefficient of refractive index distribution "A" is −1.19×10⁻⁴, as shown by graph C in FIG. 23.

The optimum coefficient of refractive index distribution "A" also depends on the shape or disposition of a lens. Furthermore, the optimum coefficient of refractive index distribution "A" may be calculated so as to correct the curvature of field caused by the combination of a lens together with other lenses.

TABLE 7

| Surface Name/No. | R | Rz | D | N |
|---|---|---|---|---|
| polygonal mirror | | | 75.00 | |
| 1 | 350.715 | R.S. | 10.00 | 1.55(*7) |
| 2 | −211.785 | −50.40(*8) | 239.17 | |

"*7" ... refractive index of the lens portion on the optical axis.

"*8" ... The "Rz" is varied in a manner such as indicated in the above parentheses, so as to coincide the focal point in the main scanning direction with that in the sub-scanning direction.

Table 8 shows the concrete numerical data of the scanning optical system according to the sixth embodiment of the present invention, to which the third aspect of the present invention is applied.

Figure 20:
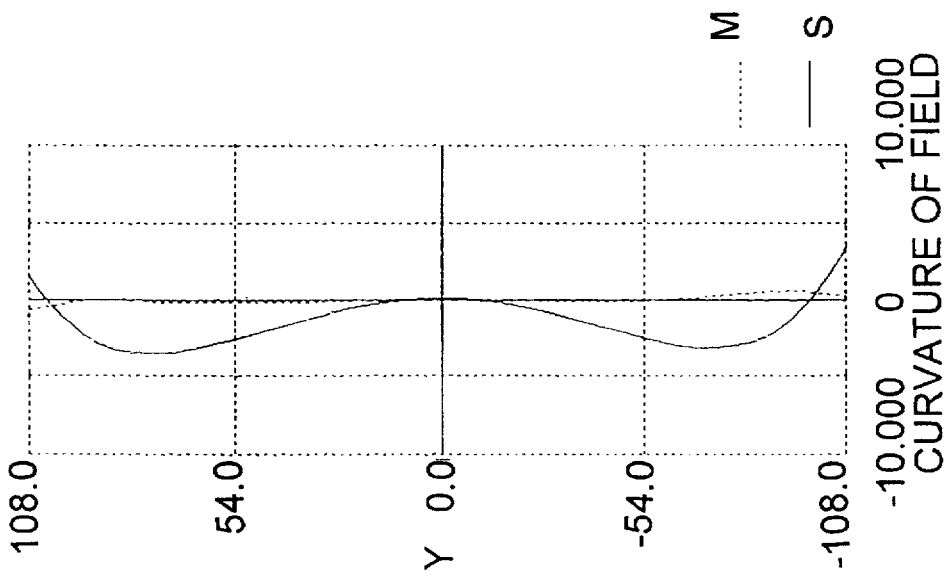
FIG. 20 is a graph showing the curvature of field of the scanning optical system illustrated in FIGS. 17 and 18.
Figure 19:
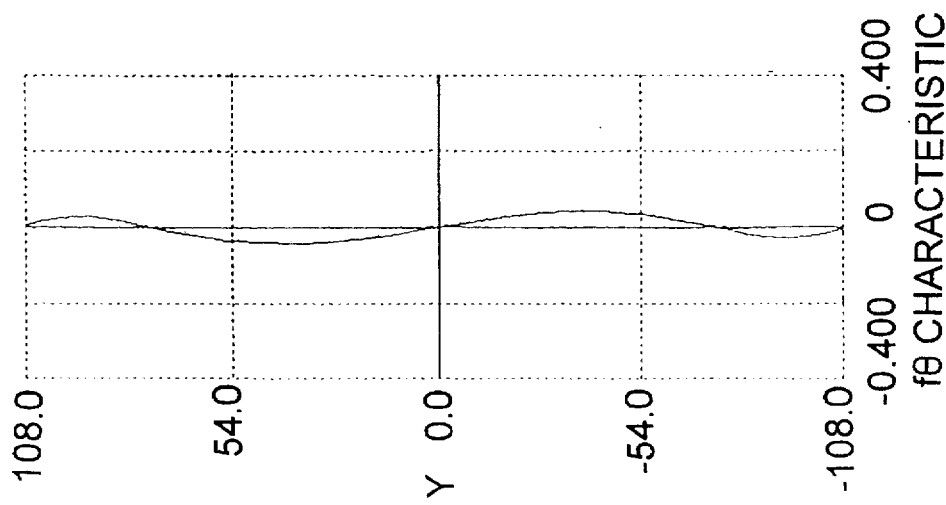
FIG. 19 is a graph showing the fθ characteristic of the scanning optical system illustrated in FIGS. 17 and 18.

FIG. 19 is a graph showing the results of measuring the fθ characteristic in the scanning optical system of the sixth embodiment having the specific numerical values shown in Table 8. FIG. 20 shows a graph displaying the result of measuring the curvature of field in the scanning optical system of the sixth embodiment in the meridional section M and in the sagittal section S. In FIGS. 19 and 20, the vertical line Y designates the position in the main scanning direction. In FIG. 19, the horizontal line designates the displacement of the image height with respect to the ideal image height (mm). In FIG. 20, the horizontal line designates the displacement of the image plane with respect to the ideal image plane (mm). The scale of the horizontal line in FIG. 20 is different from that in FIG. 23.

TABLE 8

| scanning coefficient = 242 Surface Name/No. | | R | Rz | D | N |
|---|---|---|---|---|---|
| cylindrical lens | 1 | ∞ | 38.80 | 4.00 | 1.48479 |
| 15 | 2 | ∞ | | 92.35 | |
| polygonal mirror | | | | 75.00 | |
| 1** | | 350.715 | R.S. | 10.00 | (*9) |
| 2 | | −211.785 | −50.40 | 239.17 | |

"R.S." indicates the same value as "R" (i.e., the radius of curvature along a main scanning plane) since the surface is rotationally symmetrical about the optical axis.

"*9" ... The refractive index N of the fθ lens 220 has a distribution derived from the following equation (9) when the coefficient of refractive index distribution A of the fθ lens is −1.19×10⁻⁴.

$$N=1.55-1.19\times10^{-4}\times z^2 \qquad (9)$$

where "z" is the distance from the optical axis.

The refractive index distribution is rotationally symmetrical about the optical axis.

The first surface 220a of the fθ lens 220 is formed as a rotationally symmetrical aspherical surface about the optical axis, and the second surface 220b of the fθ lens 220 is formed as a toric surface.

"**" indicates an aspherical surface which is rotationally symmetrical about the optical axis.

The first surface 220a of the fθ lens 220 has the following coefficients:

K=1.9540 A4=−8.85481×10⁻⁸ A6=7.32774×10⁻¹² as defined with regard to the following equation (10):

$$x=Ch^2\{1+[1-(1+K)C^2h^2]^{1/2}\}+A4h^4+A6h^6+A8h^8+ \qquad (10)$$

where

"h" represents the height from the optical axis,

"x" represents the distance from a tangent plane of an aspherical vertex,

"C" represents the curvature of the aspherical vertex (1/r),

"K" represents the conic constant,

"A4" represents the fourth-order aspherical factor,

"A6" represents the sixth-order aspherical factor, and

"A8" represents the eighth-order aspherical factor.

As can be seen from the foregoing, according to the third aspect of the present invention, since the scanning lens is provided with a refractive index distribution in the sub-scanning direction, the curvature of field in the sub-scanning direction can be corrected without the necessity of any complicated lens surfaces.

As can be seen from the foregoing, according to the present invention, the curvature of field in the main scanning direction is adequately corrected without the use of a scanning lens system including an aspherical surface of a lens. Furthermore, according to the present invention, the curvature of field in the sub-scanning direction is adequately corrected without requiring utilization of any complicated lens surface.

I claim:

1. A scanning optical system, comprising:

a light source for emitting a beam of light;

a light deflector for deflecting said beam of light in a main scanning direction;

a scanning lens which received said beam of light deflected by said light deflector for focusing said beam of light onto a scanning surface;

said scanning lens having a refractive index distribution in at least said main scanning direction; and a correcting lens, provided between said scanning lens and said scanning surface, having a power is a sub-scanning direction perpendicular to said main scanning direction so as to correct a curvature of field in said sub-scanning direction.

2. The scanning optical system of claim 1, wherein said scanning lens is a positive lens having a positive power in said main scanning direction.

3. The scanning optical system of claim 2, wherein at least one surface of said positive lens is an anamorphic surface.

4. The scanning optical system of claim 3, wherein said anamorphic surface is a toric surface with a positive power, a radius of curvature of said toric surface in said main scanning direction being larger than a radius of curvature in a sub-scanning direction perpendicular to said main scanning direction.

5. The scanning optical system of claim 3, wherein a radius of curvature of said positive lens in a sub-scanning direction perpendicular to said main scanning direction is varied depending upon a distance from an optical axis of said scanning lens.

6. The scanning optical system of claim 5, wherein said radius of curvature adds a negative power to said anamorphic surface, said negative power increasing away from said optical axis along said main scanning direction.

7. The scanning optical system of claim 1, wherein said scanning lens is comprised of a single lens.

8. The scanning optical system of claim 1, wherein said refractive index distribution has a refractive index which decreases with distance away from an optical axis of said scanning lens along said main scanning direction.

9. The scanning optical system of claim 1, wherein said refractive index distribution is rotationally symmetrical about an optical axis of said scanning lens.

10. The scanning optical system of claim 1, wherein a surface of said correcting lens which faces said scanning lens has a toric surface with a rotational axis extending in said main-scanning direction.

11. The scanning optical system of claim 1, said scanning lens comprising a fθ-lens.

12. A scanning optical system, comprising:

a light source for emitting a beam of light;

a light deflector for deflecting said beam of light in a main scanning direction;

a scanning lens which receives said beam of light deflected by said light deflector for focusing said deflected beam of light onto a scanning surface; and said scanning lens having a refractive index distribution in a sub-scanning direction perpendicular to said main scanning direction and a thickness variation in said sub-scanning direction.

13. The scanning optical system of claim 12, wherein said scanning lens is a single lens.

14. The scanning optical system of claim 12, wherein said refractive index distribution has a refractive index which decreases with distance away from an optical axis of said scanning lens along sub-scanning direction.

15. The scanning optical system of claim 12, wherein said scanning lens is a positive lens having a positive power in said main scanning direction.

16. The scanning optical system of claim 12, wherein one surface of said scanning lens is a rotationally symmetrical aspherical surface about an optical axis of said scanning lens, and another surface of said scanning lens is a toric surface.

17. The scanning optical system of claim 12, said scanning lens being a convex lens, a center of convexity of said scanning lens having a largest refractive index.

18. The scanning optical system of claim 12, said scanning lens comprising a convex lens, said refractive index becoming smaller as a distance from a center of said lens increases.

19. A scanning optical system, comprising:

a light source for emitting a beam of light;

a light deflector for deflecting said beam of light in a main scanning direction;

a scanning lens which received said beam of light deflected by said light deflector for focusing said beam of light onto a scanning surface;

said scanning lens having a refractive index distribution in at least said main scanning direction, said scanning lens having a thickness that varies in the main scanning direction.

20. The scanning optical system of claim 19, wherein said scanning lens is a positive lens having a positive power in said main scanning direction.

21. The scanning optical system of claim 20, wherein at least one surface of said positive lens is an anamorphic surface.

22. The scanning optical system of claim 21, wherein said anamorphic surface is a toric surface which has a positive power, a radius of curvature of said toric surface in said main scanning direction being larger than a radius of curvature in a sub-scanning direction perpendicular to said main scanning direction.

23. The scanning system of claim 21, wherein a radius of curvature of said positive lens in said sub-scanning direction varies depending upon a distance from an optical axis of said scanning lens.

24. The scanning system of claim 21, wherein said radius of curvature varies such that a negative power is added to said anamorphic surface, said negative power increasing in a direction away from said optical axis along said main scanning direction.

25. The scanning optical system of claim 19, wherein said scanning lens is comprised of a single positive lens.

26. The scanning optical system of claim 19, wherein said refractive index distribution decreases along a direction away from an optical axis of said scanning lens along said main scanning direction.

27. The scanning optical system of claim 19, wherein said refractive index distribution is rotationally symmetrical about an optical axis of said scanning lens.

28. The scanning optical system of claim 19, further comprising a correcting lens, provided between said scanning lens and said scanning surface, having a power in a sub-scanning direction perpendicular to said main scanning direction so as to correct a curvature of field in said sub-scanning direction.

29. The scanning optical system of claim 28, wherein one surface of said correcting lens which faces in the direction of said scanning lens is a toric surface which has a rotational axis extending in said sub-scanning direction.

* * * * *